(12) United States Patent
Li et al.

(10) Patent No.: US 12,471,082 B2
(45) Date of Patent: Nov. 11, 2025

(54) SCHEDULING ENERGY AUTOENCODER BASED NONCOHERENT TRANSMISSION

(71) Applicant: QUALCOMM Incorporated, San Diego, CA (US)

(72) Inventors: Qiaoyu Li, Beijing (CN); Yu Zhang, San Diego, CA (US); Hao Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 362 days.

(21) Appl. No.: 18/245,675

(22) PCT Filed: Nov. 25, 2020

(86) PCT No.: PCT/CN2020/131356
§ 371 (c)(1),
(2) Date: Mar. 16, 2023

(87) PCT Pub. No.: WO2022/109839
PCT Pub. Date: Jun. 2, 2022

(65) Prior Publication Data
US 2023/0362925 A1   Nov. 9, 2023

(51) Int. Cl.
*H04W 72/1268* (2023.01)
*H04W 72/232* (2023.01)

(52) U.S. Cl.
CPC ..... *H04W 72/1268* (2013.01); *H04W 72/232* (2023.01)

(58) Field of Classification Search
CPC .......... H04W 72/1268; H04W 72/232; G06N 3/045; G06N 3/088; H04L 27/2601; H04L 5/0048; H04L 5/0051; H04L 5/0057

(Continued)

(56) References Cited

U.S. PATENT DOCUMENTS

2019/0132882 A1   5/2019 Li et al.
2019/0223184 A1   7/2019 Sarkis et al.
(Continued)

FOREIGN PATENT DOCUMENTS

CN   103313417 A   9/2013
CN   111295923 A   6/2020
(Continued)

OTHER PUBLICATIONS

ERICSSON: "Corrections to eMTC", 3GPP TSG-RAN WG1 Meeting #94, R1-1810030, Gothenburg, Sweden, Aug. 20-24, 2018, 21 Pages, The whole document.

(Continued)

*Primary Examiner* — Candal Elpenord
(74) *Attorney, Agent, or Firm* — Harrity & Harrity, LLP

(57) ABSTRACT

Various aspects of the present disclosure generally relate to wireless communication. In some aspects, a user equipment (UE) may identify multiple resource element (RE) segments associated with a scheduled communication that includes a source bit sequence, each RE segment including one or more REs in one or more scheduled physical resource blocks associated with the scheduled communication. The UE may communicate with a device based at least in part on respective energies on the one or more REs included in the multiple RE segments associated with the scheduled communication. For example, communicating with the device may include transmitting or detecting a sub-sequence associated with an RE segment using a neural network that modulates the sub-sequence associated with the RE segment to the one or more REs in the RE segment. Numerous other aspects are provided.

34 Claims, 8 Drawing Sheets

(58) Field of Classification Search
USPC .................................................. 370/329–330
See application file for complete search history.

(56) References Cited

U.S. PATENT DOCUMENTS

| | | | |
|---|---|---|---|
| 2019/0230688 A1 | 7/2019 | Huang et al. | |
| 2019/0363831 A1 | 11/2019 | Davydov et al. | |
| 2020/0015206 A1* | 1/2020 | Lee | H04L 5/1469 |
| 2020/0343985 A1* | 10/2020 | O'Shea | G06N 20/00 |
| 2021/0360615 A1* | 11/2021 | Yang | H04L 5/0007 |
| 2022/0294558 A1* | 9/2022 | Park | H04L 5/0007 |
| 2022/0312424 A1* | 9/2022 | Ye | H04L 1/00 |
| 2023/0367005 A1* | 11/2023 | Hwang | G01S 13/58 |

FOREIGN PATENT DOCUMENTS

| | | |
|---|---|---|
| WO | 2020036720 A1 | 2/2020 |
| WO | 2020066013 A1 | 4/2020 |
| WO | 2020220367 | 11/2020 |

OTHER PUBLICATIONS

International Search Report and Written Opinion—PCT/CN2020/131356—ISA/EPO—Aug. 23, 2021.

Motorola Mobility., et al., "Short PUCCH for up to 2 Bit UCI", 3GPP TSG RAN WG 1 NR Ad-Hoc#2, R1-1711282, 3rd Generation Partnership Project, Mobile Competence Centre 650, Route Des Lucioles, F-06921, Sophia-Antipolis Cedex, France, vol. RAN WG1, No. Qingdao, Jun. 27, 2017-Jun. 30, 2017, Jun. 27, 2017, Jun. 26, 2017, pp. 1-8.

Supplementary European Search Report—EP20962730—Search Authority—The Hague—Jun. 13, 2024.

Choi J., et al., "Noncoherent OFDM-IM and Its Performance Analysis", IEEE Transactions ON Wireless Communications, vol. 17, No. 1, Jan. 2018, pp. 352-360.

Huang J., et al., "Design of Noncoherent Communications: From Statistical Method to Machine Learning", Intelligent Radio: When Artificial Intelligence Meets the Radio Network, IEEE Wireless Communications, Feb. 2020, pp. 76-83.

Luong T. V., "Deep Energy Autoencoder for Noncoherent Multicarrier MU-SIMO Systems", IEEE Transactions on Wireless Communications, vol. 19, No. 6, Jun. 2020, pp. 3952-3962.

Xue S., et al., "Unsupervised Deep Learning for MU-SIMO Joint Transmitter and Noncoherent Receiver Design", IEEE Wireless Communications Letters, vol. 8, No. 1, Feb. 2019, pp. 177-180.

Zhang H., et al., "Noncoherent Energy-Modulated Massive SIMO in Multipath Channels: A Machine Learning Approach", IEEE Internet of Things Journal, vol. 7, No. 9, Sep. 2020, pp. 8263-8270.

* cited by examiner

SCHEDULING ENERGY AUTOENCODER BASED NONCOHERENT TRANSMISSION

CROSS-REFERENCE TO RELATED APPLICATION

This application is a 371 national stage of PCT Application No. PCT/CN2020/131356 filed on Nov. 25, 2020, entitled "SCHEDULING ENERGY AUTOENCODER BASED NONCOHERENT TRANSMISSION," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for scheduling energy autoencoder based noncoherent transmission.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes identifying multiple resource element (RE) segments associated with a scheduled communication that includes a source bit sequence, wherein the multiple RE segments each include one or more REs in one or more scheduled physical resource blocks (PRBs) associated with the scheduled communication; and communicating with a device based at least in part on respective energies on the one or more REs included in the multiple RE segments associated with the scheduled communication, wherein the multiple RE segments are each associated with a sub-sequence associated with a source bit sequence segmented into multiple sub-sequences, and wherein communicating with the device includes transmitting or detecting the sub-sequence associated with an RE segment, among the multiple RE segments, using a neural network that modulates the sub-sequence associated with the RE segment to the one or more REs in the RE segment.

In some aspects, a UE for wireless communication includes a memory and one or more processors operatively coupled to the memory, the memory and the one or more processors configured to: identify multiple RE segments associated with a scheduled communication that includes a source bit sequence, wherein the multiple RE segments each include one or more REs in one or more scheduled PRBs associated with the scheduled communication; and communicate with a device based at least in part on respective energies on the one or more REs included in the multiple RE segments associated with the scheduled communication, wherein the multiple RE segments are each associated with a sub-sequence associated with a source bit sequence segmented into multiple sub-sequences, and wherein communicating with the device includes transmitting or detecting the sub-sequence associated with an RE segment, among the multiple RE segments, using a neural network that modulates the sub-sequence associated with the RE segment to the one or more REs in the RE segment.

In some aspects, a non-transitory computer-readable medium storing a set of instructions for wireless communication includes one or more instructions that, when executed by one or more processors of a UE, cause the UE to: identify multiple RE segments associated with a scheduled communication that includes a source bit sequence, wherein the multiple RE segments each include one or more REs in one or more scheduled PRBs associated with the scheduled communication; and communicate with a device based at least in part on respective energies on the one or more REs included in the multiple RE segments associated with the scheduled communication, wherein the multiple RE segments are each associated with a sub-sequence associated with a source bit sequence segmented into multiple sub-sequences, and wherein communicating with the device includes transmitting or detecting the sub-sequence associated with an RE segment, among the multiple RE segments, using a neural network that modulates the sub-sequence associated with the RE segment to the one or more REs in the RE segment.

In some aspects, an apparatus for wireless communication includes means for identifying multiple RE segments associated with a scheduled communication that includes a source bit sequence, wherein the multiple RE segments each include one or more REs in one or more scheduled PRBs associated with the scheduled communication; and means for communicating with a device based at least in part on respective energies on the one or more REs included in the multiple RE segments associated with the scheduled communication, wherein the multiple RE segments are each associated with a sub-sequence associated with a source bit sequence segmented into multiple sub-sequences, and wherein the means for communicating with the device includes means for transmitting or detecting the sub-sequence associated with an RE segment, among the multiple RE segments, using a neural network that modulates the sub-sequence associated with the RE segment to the one or more REs in the RE segment.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
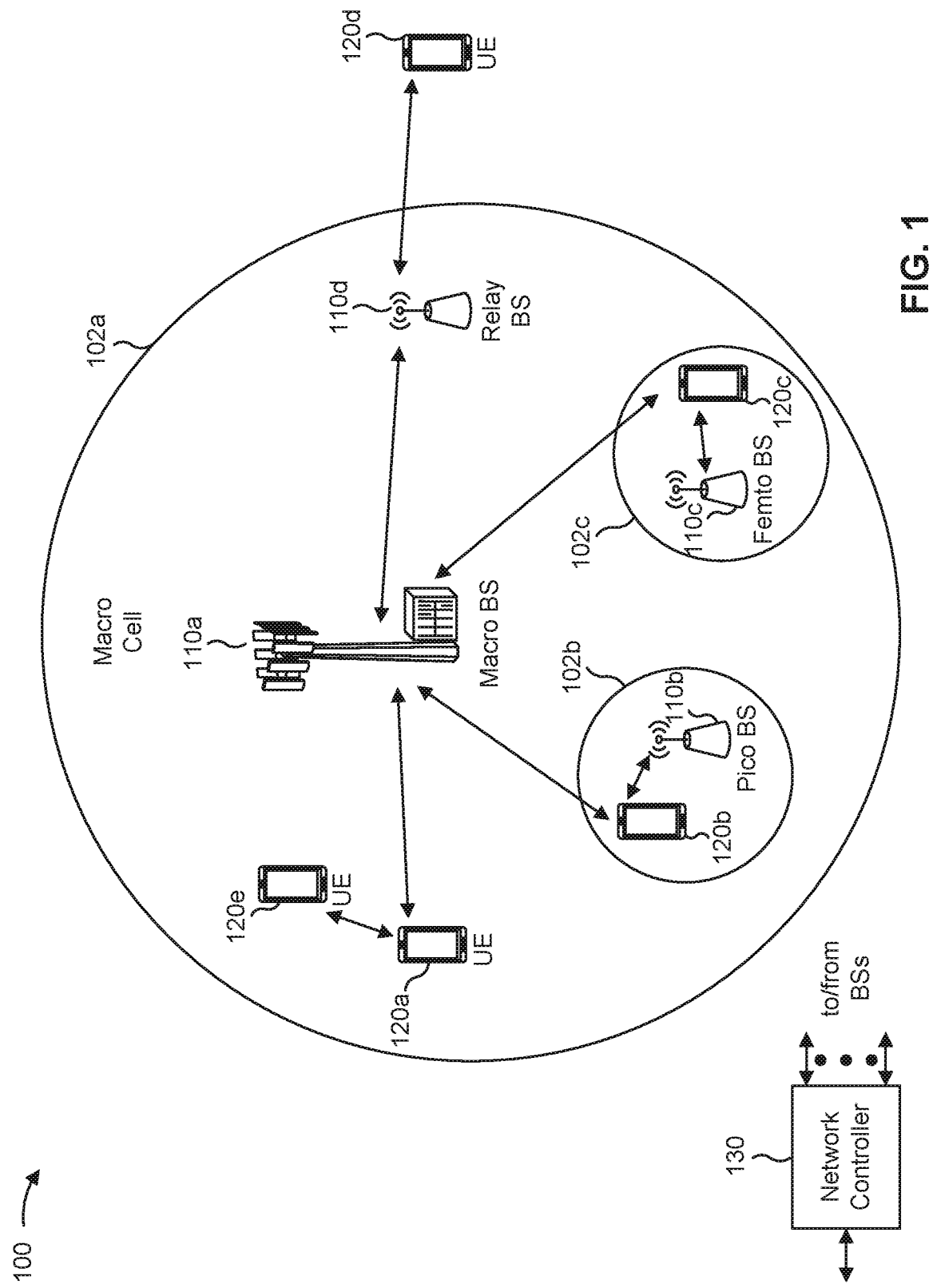
FIG. 1 is a diagram illustrating an example of a wireless network, in accordance with various aspects of the present disclosure.

FIG. 1 is a diagram illustrating an example of a wireless network 100, in accordance with various aspects of the present disclosure. The wireless network 100 may be or may include elements of a 5G (NR) network and/or an LTE network, among other examples. The wireless network 100 may include a number of base stations 110 (shown as BS 110*a*, BS 110*b*, BS 110*c*, and BS 110*d*) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
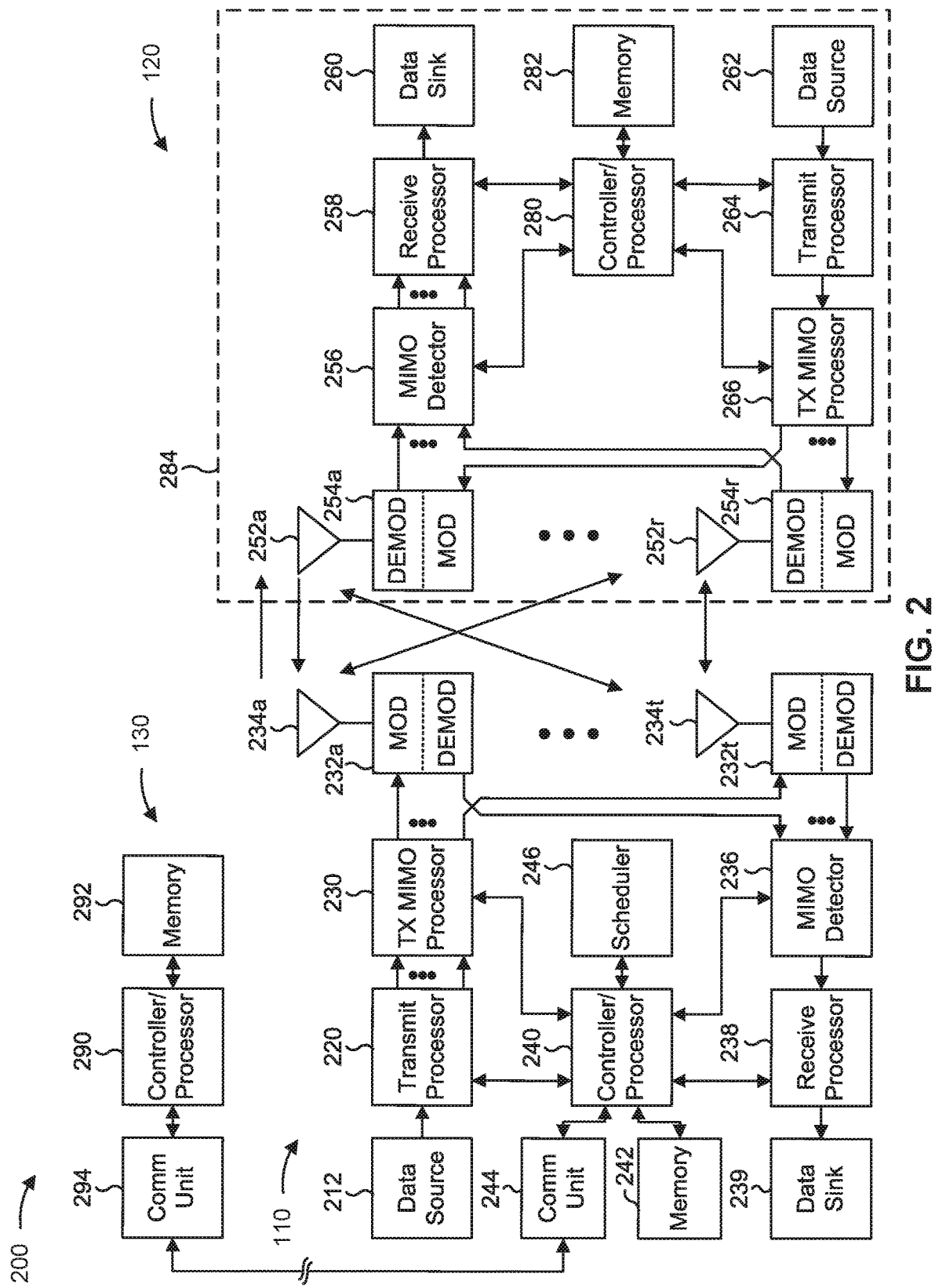
FIG. 2 is a diagram illustrating an example of a base station in communication with a UE in a wireless network, in accordance with various aspects of the present disclosure.

FIG. 2 is a diagram illustrating an example 200 of a base station 110 in communication with a UE 120 in a wireless network 100, in accordance with various aspects of the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 6-7.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 6-7.

Controller/processor 240 of base station 110, controller/processor 280 of UE 120, and/or any other component(s) of FIG. 2 may perform one or more techniques associated with scheduling energy autoencoder based noncoherent transmission, as described in more detail elsewhere herein. For example, controller/processor 240 of base station 110, controller/processor 280 of UE 120, and/or any other component(s) of FIG. 2 may perform or direct operations of, for example, process 700 of FIG. 7 and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7 and/or other processes as described herein. In some aspects, executing instructions may include running the instructions, converting the instructions, compiling the instructions, and/or interpreting the instructions, among other examples.

In some aspects, the UE 120 includes means for identifying multiple resource element (RE) segments associated with a scheduled communication that includes a source bit sequence, wherein the multiple RE segments each include one or more REs in one or more scheduled physical resource blocks (PRBs) associated with the scheduled communication, and/or means for communicating with a device based at least in part on respective energies on the one or more REs included in the multiple RE segments associated with the scheduled communication, wherein the multiple RE segments are each associated with a sub-sequence associated with a source bit sequence segmented into multiple sub-sequences, and wherein communicating with the device includes transmitting or detecting the sub-sequence associated with an RE segment, among the multiple RE segments, using a neural network that modulates the sub-sequence associated with the RE segment to the one or more REs in the RE segment. The means for the UE 120 to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the UE 120 includes means for receiving signaling that indicates one or more of: a segmentation method associated with the one or more REs in the RE segment, a segmentation method associated with one or more bits in the sub-sequence associated with the RE segment, or the neural network that modulates the sub-sequence associated with the RE segment to the one or more REs in the RE segment.

In some aspects, the UE 120 includes means for determining that the scheduled communication includes a physical uplink control channel (PUCCH), means for determining a PUCCH format based at least in part on one or more segmentation methods or transmission neural networks associated with modulating the multiple sub-sequences to the one or more REs in the multiple RE segments, and/or means for transmitting the PUCCH based at least in part on the PUCCH format.

In some aspects, the UE 120 includes means for determining a PUCCH resource set associated with the PUCCH, and/or means for modulating, for different PUCCH resources within the PUCCH resource set, the multiple sub-sequences to the one or more REs in the multiple RE segments using the one or more segmentation methods or transmission neural networks, wherein the one or more segmentation methods or transmission neural networks are configured by configurations associated with the PUCCH resources.

In some aspects, the UE 120 includes means for determining, based at least in part on downlink control information (DCI) that indicates a PUCCH resource for hybrid automatic repeat request acknowledgement (HARQ-ACK) feedback associated with a physical downlink shared channel (PDSCH) scheduled by the DCI, the one or more segmentation methods or transmission neural networks associated with modulating the multiple sub-sequences, and/or means for modulating the multiple sub-sequences to the one or more REs in the multiple RE segments using the one or more segmentation methods or transmission neural networks for the PUCCH resource indicated in the DCI.

In some aspects, the UE 120 includes means for determining that the scheduled communication includes a physical downlink control channel (PDCCH); means for determining one or more segmentation methods or transmission neural networks associated with modulating the multiple sub-sequences to the one or more REs in the multiple RE segments based at least in part on one or more resource element group (REG) bundles or control channel elements (CCEs) associated with the PDCCH; and/or means for detecting the source bit sequence in the PDCCH based at least in part on the one or more segmentation methods or transmission neural networks.

In some aspects, the UE 120 includes means for determining a priority associated with one or more search spaces or control resource sets (CORESETs) based at least in part on the one or more segmentation methods or transmission neural networks, and/or means for monitoring the PDCCH based at least in part on the priority associated with the one or more search spaces or CORESETs.

In some aspects, the UE 120 includes means for determining a priority associated with the one or more search spaces or CORESETs based at least in part on the one or more segmentation methods or transmission neural networks, and/or means for refraining from monitoring the PDCCH based at least in part on the priority associated with the one or more search spaces or CORESETs.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
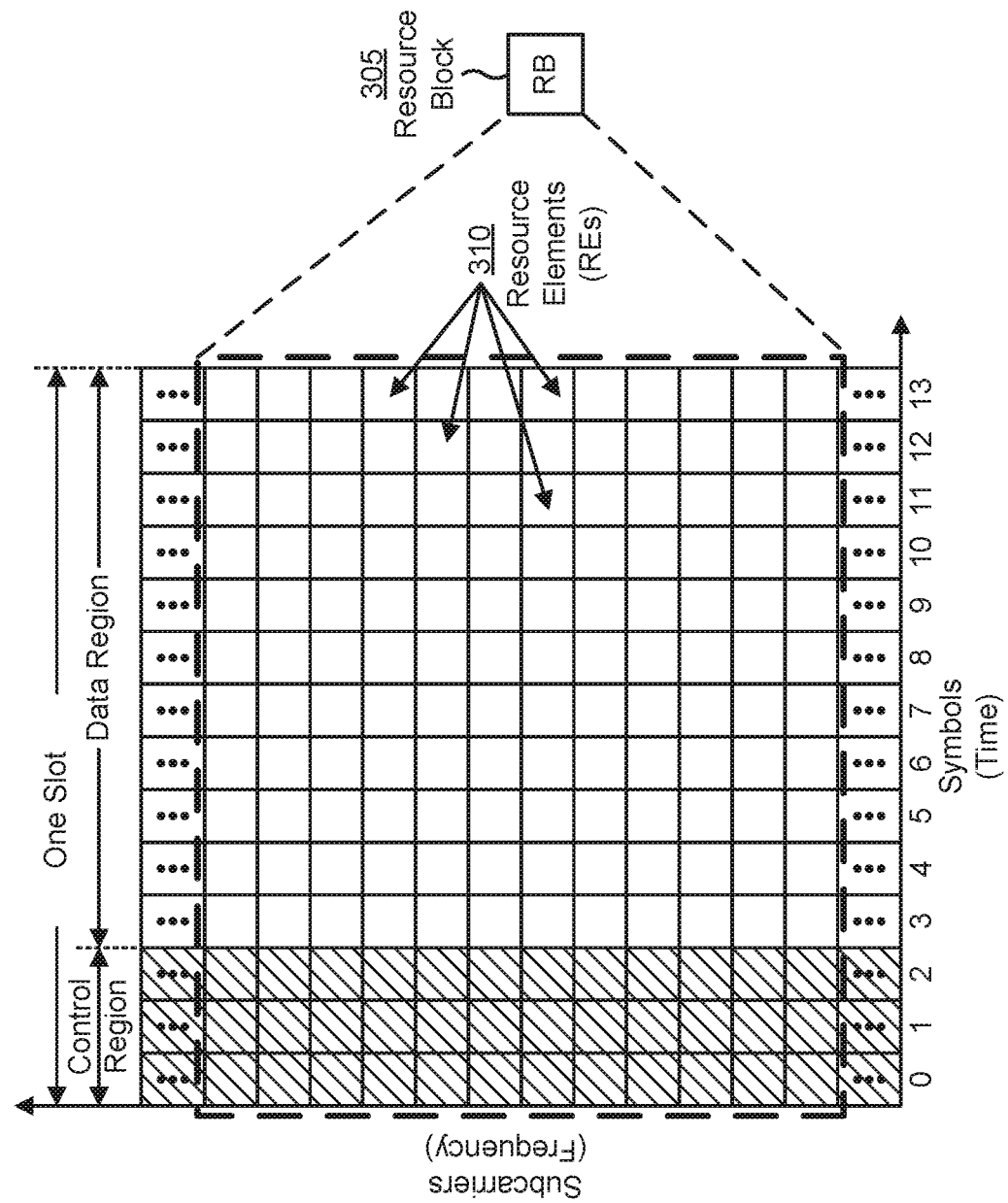
FIG. 3 is a diagram illustrating an example of a slot format, in accordance with various aspects of the present disclosure.

FIG. 3 is a diagram illustrating an example 300 of a slot format, in accordance with various aspects of the present disclosure. As shown in FIG. 3, time-frequency resources in a radio access network may be partitioned into resource blocks, shown by a single resource block (RB) 305. An RB 305 is sometimes referred to as a physical resource block (PRB). An RB 305 includes a set of subcarriers (e.g., 12 subcarriers) and a set of symbols (e.g., 14 symbols) that are schedulable as a unit (e.g., by a base station 110). In some aspects, an RB 305 may include a set of subcarriers in a single slot. As shown, a single time-frequency resource included in an RB 305 may be referred to as a resource element (RE) 310. An RE 310 may include a single subcarrier (e.g., in frequency) and a single symbol (e.g., in time). A symbol may be referred to as an orthogonal frequency division multiplexing (OFDM) symbol. An RE 310 may be used to transmit one modulated symbol, which may be a real value or a complex value.

In some telecommunication systems (e.g., NR), RBs 305 may span 12 subcarriers with a subcarrier spacing of, for example, 15 kilohertz (kHz), 30 kHz, 60 kHz, or 120 kHz, among other examples, over a 0.1 millisecond (ms) duration. A radio frame may include 40 slots and may have a length of 10 ms. Consequently, each slot may have a length of 0.25 ms. However, a slot length may vary depending on a numerology used to communicate (e.g., a subcarrier spacing, a cyclic prefix format, and/or the like). A slot may be configured with a link direction (e.g., downlink or uplink) for transmission. In some aspects, the link direction for a slot may be dynamically configured.

As indicated above, FIG. 3 is provided as an example. Other examples may differ from what is described with regard to FIG. 3.

Figure 4:
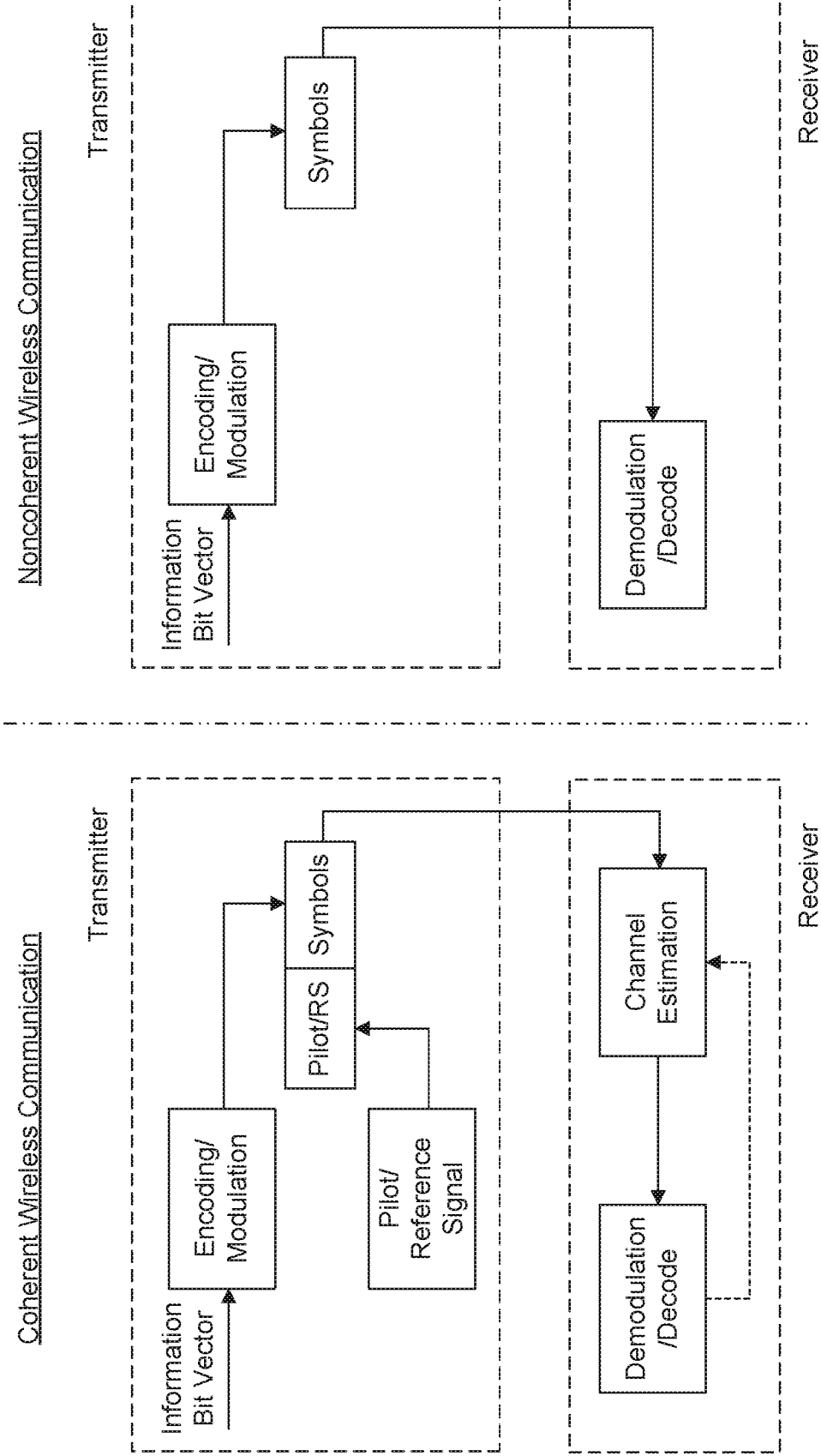
FIG. 4 is a diagram illustrating examples of coherent and noncoherent wireless communication, in accordance with various aspects of the present disclosure.

FIG. 4 is a diagram illustrating an example 400 of coherent wireless communication and an example 450 of noncoherent wireless communication, in accordance with various aspects of the present disclosure. The coherent and/or noncoherent wireless communication illustrated in FIG. 4 may be performed by wireless communication devices, such as a UE 120 and a base station 110 communicating over an access link, a UE 120 and another UE 120 communicating over a sidelink, and/or the like.

As shown in FIG. 4, and by example 400, coherent wireless communication may involve the use of pilot signals and/or reference signals. A wireless communication device (referred to herein as a "transmitter") may transmit an information bit vector (e.g., a string of bits carrying one or more types of information) by encoding the information bit vector to form one more codewords that each include multiple coded bits. The transmitter may modulate the codewords to form one or more OFDM symbols, generate a pilot signal or reference signal associated with the one or more OFDM symbols (e.g., a demodulation reference signal (DMRS) and/or another suitable reference signal), and transmit the pilot/reference signal and the OFDM symbols over a wireless physical channel (e.g., a PxxCH, which may be a physical downlink control channel (PDCCH), a physical downlink shared channel (PDSCH), a physical uplink control channel (PUCCH), a physical uplink shared channel (PUSCH), a physical sidelink control channel (PSCCH), and/or a physical sidelink shared channel (PSSCH)). The pilot/reference signal and the OFDM symbols may be transmitted over the wireless physical channel to another wireless communication device (referred to as a "receiver").

As further shown in FIG. 4, the receiver may receive the pilot/reference signal and the OFDM symbols via the physical channel, and may use the pilot/reference signal to obtain channel state information (CSI) associated with the physical channel. For example, the receiver may demodulate and decode the pilot/reference signal and the OFDM symbols, may perform a channel estimation of the physical channel based at least in part on the demodulation and/or decoding of the pilot/reference signal, and may adjust or modify demodulation and/or decoding parameters for the receiver based at least in part on the channel estimation in order to increase the efficiency and performance of demodulation and/or decoding for the receiver.

In some cases, coherent communication in a wireless system may be suboptimal at a low signal to noise ratio (SNR). For example, the energy used to transmit, decode, and/or measure pilot/reference signals may be wasted because, at low SNR, pilot/reference signals may contain little to no useful information for the receiver. Moreover, attempting to perform a channel estimation at low SNR may result in an inaccurate and/or poor quality channel estimation, which in turn may result in degraded performance in demodulation and/or decoding. Additionally, or alternatively, coherent wireless communication may be suboptimal in other use cases, such as a high Doppler scenario (e.g., when the transmitter and/or the receiver are moving at a fast rate), when transmitted packets have a small payload size (e.g., such that the transmitted packets cannot accommodate the additional payload of a pilot signal or a DMRS), and/or asynchronous communication use cases, among other examples.

Accordingly, as further shown in FIG. 4, and by example 450, a transmitter and a receiver may perform noncoherent communication to increase demodulation and/or decoding performance in low SNR scenarios. As described herein, "noncoherent communication" may generally refer to a wireless communication scheme in which the transmitter does not transmit any pilot signals or reference signals for OFDM symbols carrying data/information (e.g., a PxxCH without a DMRS). In this case, the receiver directly demodulates and decodes the received OFDM symbols without performing a channel estimation based on a pilot signal or reference signal.

Noncoherent communication schemes rely on a channel coherence principle that channel properties for adjacent coded OFDM symbols (e.g., adjacent in time resources and/or frequency resources) are the same or roughly the same. This permits a transmitter to use differential modulation (e.g., where information is modulated based at least in part on the phase difference between adjacent coded OFDM symbols) and/or sequence-based modulation (e.g., where information is modulated jointly on a sequence of OFDM symbols). However, the longer that channel coherence is used (e.g., the greater the quantity of adjacent coded OFDM symbols that are considered to be coherent), the greater the complexity of encoding at the transmitter and decoding at the receiver. In some channel encoding/decoding techniques, channel coherence may cause an exponential increase in encoding and decoding. Accordingly, noncoherent wireless communication tends to be very challenging to implement in practice.

Some aspects described herein relate to techniques and apparatuses to schedule noncoherent transmission based at least in part on an energy autoencoder. For example, an autoencoder may be an unsupervised neural network that may be trained to efficiently compress and encode data and/or to reconstruct data from a reduced encoded representation that is as close to the original input as possible. Accordingly, as described herein, an energy autoencoder may be an unsupervised neural network that can modulate an input signal (e.g., an input bit sequence) to energies on physical layer resources, and/or demodulate a transmitted signal based at least in part on energies on physical layer resources. For example, in some aspects, a transmitter may use one or more neural networks to modulate a source bit sequence onto RE segments that include one or more REs in one or more PRBs associated with a scheduled communication (e.g., a PxxCH communication), where a total transmit power is normalized over each RE segment (e.g., outputs from the one or more neural networks may include energies that are normalized over the REs in each RE segment). Accordingly, a receiver may use one or more neural networks to demodulate the transmitted bit sequences and thereby detect the source bit sequence. In this way, the energy-based modulation may be robust to fading in a wireless channel, which may be particularly useful for noncoherent transmission where a pilot signal, a DMRS, or another suitable reference signal to enable channel estimation is unavailable. Furthermore, neural networks may offer computational efficiency to configure modulation schemes that are robust to different fading scenarios, and segmenting a source bit sequence with a large number of bits into multiple sub-sequences that each correspond to one RE segment reduces receiver complexity.

As indicated above, FIG. 4 is provided as an example. Other examples may differ from what is described with regard to FIG. 4.

Figure 5:
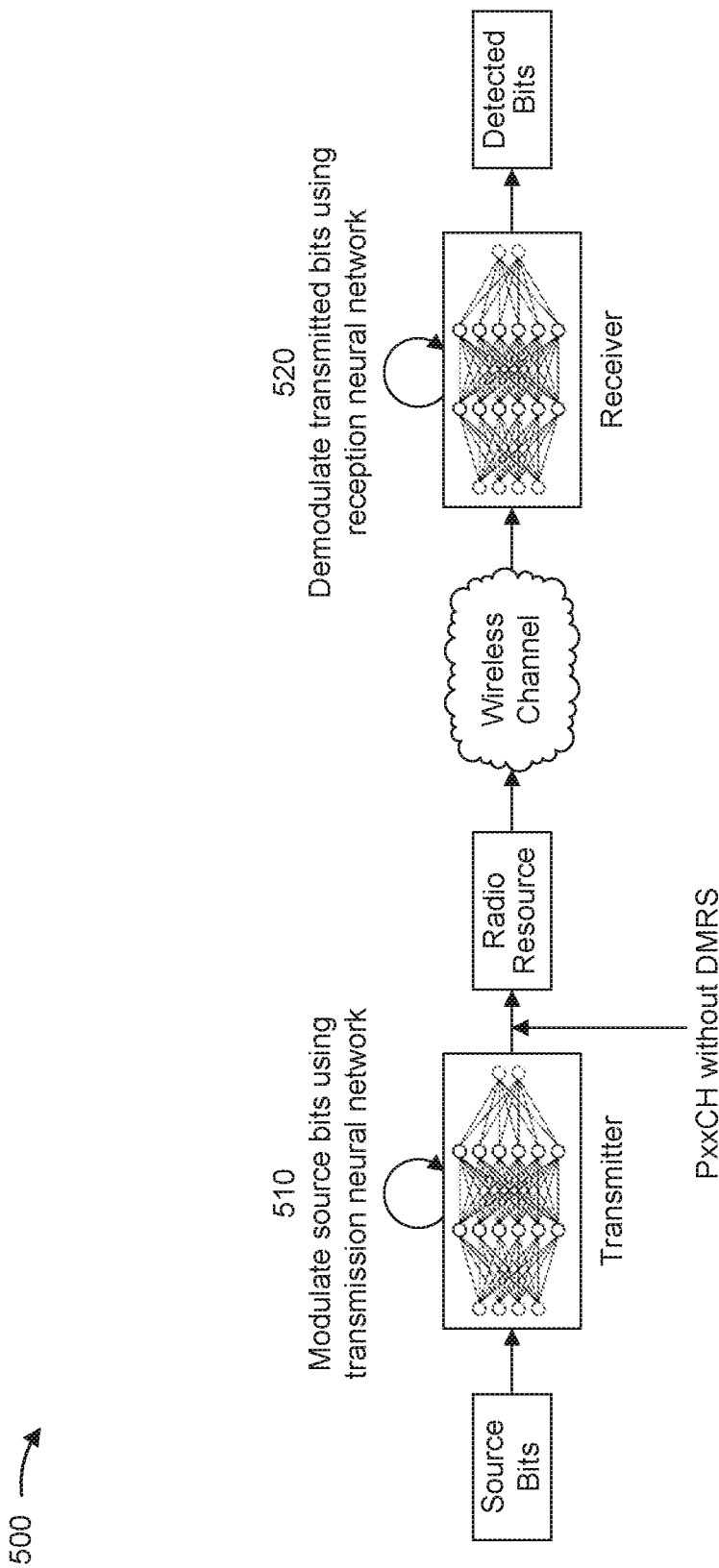
FIG. 5 is a diagram illustrating an example of noncoherent wireless communication using transmitter-side and receiver-side neural networks for modulation and detection, in accordance with various aspects of the present disclosure.

FIG. 5 is a diagram illustrating an example 500 of noncoherent wireless communication using transmitter-side and receiver-side neural networks for modulation and detection, in accordance with various aspects of the present disclosure. In some aspects, the noncoherent wireless communication shown in FIG. 5 may be performed between a transmitter and a receiver in a wireless network. For example, in some aspects, the receiver may be a base station and the transmitter may be a UE that is scheduled to transmit a PUCCH and/or a PUSCH to the base station. Additionally, or alternatively, the transmitter may be a base station and the receiver may be a UE that is scheduled to receive a PDCCH and/or a PDSCH from the base station. Additionally, or alternatively, the transmitter may be a first UE and the receiver may be a second UE, in which case the first UE may be scheduled to transmit and the second UE may be scheduled to receive a PSCCH and/or a PSSCH over a sidelink.

As shown in FIG. 5, the transmitter and the receiver may perform noncoherent wireless communication, whereby a transmitted PxxCH does not include a DMRS, a pilot signal, or another reference signal to enable channel estimation at the receiver. In general, as described above, noncoherent wireless communication may increase demodulation and/or decoding performance in low SNR, high Doppler, small packet, and/or asynchronous communication scenarios, among other examples.

For example, when performing noncoherent transmission in which a PxxCH is transmitted without a DMRS, pilot signal, or other signal to enable channel estimation at the receiver, the transmitter may modulate source bits to constellations suitable for noncoherent detection. For example, the transmitter may modulate the source bits to hand-crafted constellations associated with one or more radio resources (e.g., defined across REs associated with a scheduled PxxCH communication from the transmitter to the receiver). At the receiver, the transmitted bits (e.g., the modulated source bits that are transmitted to the receiver over a wireless channel) may be demodulated using maximum likelihood detection, such that detected bits that are decoded or otherwise determined at the receiver approximately reconstruct the source bits. Although noncoherent wireless communication using hand-crafted constellations and maximum likelihood detection may improve demodulation and/or decoding performance in some use cases, hand-crafted constellations and maximum likelihood detection metrics tend to be sensitive to different fading scenarios. For example, hand-crafted constellations and maximum likelihood detection metrics may be robust in the presence of additive white Gaussian noise but non-robust with a large delay spread, among other examples.

Accordingly, some aspects described herein relate to a joint transmit-receive (Tx-Rx) design in which artificial intelligence techniques use one or more neural networks in an encoder (e.g., an autoencoder) and a decoder to enable noncoherent wireless communication. For example, as shown by reference number 510, the transmitter may provide source bits (e.g., an input bit sequence) to a transmission neural network that modulates the source bits to a radio resource (e.g., a group of REs in one or more scheduled PRBs associated with a scheduled PxxCH communication from the transmitter to the receiver). As further shown by reference number 520, the receiver may demodulate the transmitted bits (e.g., the modulated source bits that are transmitted to the receiver over a wireless channel) using a reception neural network in order to decode detected bits that approximately reconstruct the source bits.

In some aspects, the transmission neural network used to modulate the source bits and the reception neural network used for demodulating and/or decoding may be jointly trained (e.g., offline using CSI samples). In this way, the joint Tx-Rx design using a transmission neural network at the transmitter and a reception neural network at the receiver may provide data-driven robustness based on channel models, in that autoencoders may not require knowledge of the underlying data distribution of the input or an explicit identification of a structure of the input. For example, a neural network-based encoder/decoder is sometimes applied for CSI feedback in massive multiple input multiple output (MIMO) systems. CSI feedback in MIMO frequency division duplex (FDD) systems is typically associated with significant overhead and relates to sparse channels, which leads to significant compression gains using a neural network-based encoder/decoder. Furthermore, using simple neural networks to enable noncoherent wireless communication may offer comparable or reduced receiver complexity relative to maximum likelihood detection techniques.

As indicated above, FIG. 5 is provided as an example. Other examples may differ from what is described with regard to FIG. 5.

Figure 6:
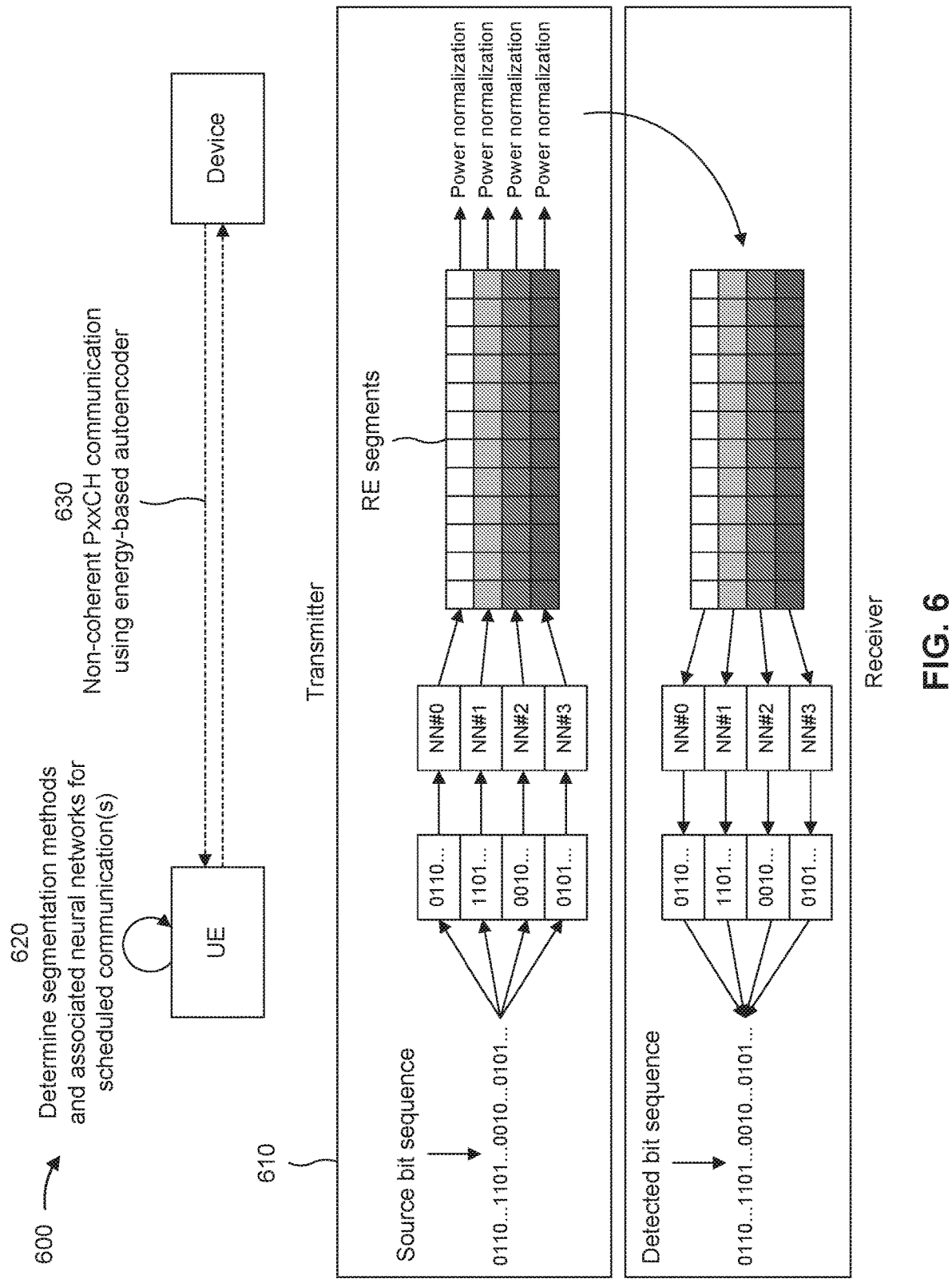
FIG. 6 is a diagram illustrating an example associated with scheduling energy autoencoder based noncoherent transmission, in accordance with various aspects of the present disclosure.

FIG. 6 is a diagram illustrating an example 600 associated with scheduling energy autoencoder based noncoherent transmission, in accordance with various aspects of the present disclosure. As shown in FIG. 6, example 600 includes a UE (e.g., UE 120) that may transmit one or more scheduled communications to, and/or receive one or more scheduled communications from, another device in a wireless network (e.g., wireless network 100). For example, the other device may be a base station (e.g., base station 110) that communicates with the UE via a wireless access link, which may include an uplink and a downlink, and the UE may be scheduled to transmit a PUCCH and/or a PUSCH to the base station and/or to receive a PDCCH and/or a PDSCH from the base station via the wireless access link. Additionally, or alternatively, the other device may be another UE that communicates with the UE via a wireless sidelink, and the UE may be scheduled to transmit a PSCCH and/or a PSSCH to the other UE and/or to receive a PSCCH and/or a PSSCH from the other UE via the wireless sidelink.

In some aspects, as described herein, the UE and the other device may communicate (e.g., transmit and/or receive) scheduled communications using energy-based autoencoders that are suitable for noncoherent transmission (e.g., where a transmitted PxxCH does not include a pilot signal, a DMRS, or another suitable signal to enable channel estimation at the receiver). For example, in some aspects, a transmitter may use a neural network to modulate a source bit sequence onto one or more REs in one or more scheduled PRBs associated with a scheduled communication with only energies (e.g., where a total transmit power is normalized over one or more RE groups), and a neural network can be used at the receiver to demodulate the transmitted bit sequences. In this way, modulating the source bit sequence to energies associated with physical layer resources may be robust to fading, especially in noncoherent wireless communication where a DMRS or other channel estimation signal is unavailable (e.g., because the receiver does not need to know the phase of the received signal, and instead needs to only detect the energies in physical layer resources). Furthermore, using neural networks for transmission and reception may enable computationally efficient modulation schemes that are robust to different fading scenarios (e.g., high Doppler or high delay spread), and segmenting long source bit sequences into multiple sub-sequences can significantly reduce receiver complexity (e.g., because a more complex neural network and/or more complex maximum likelihood detection may be needed to demodulate a long source bit sequence).

As shown by reference number 610, the UE may be configured as a transmitter or a receiver for one or more scheduled communications. For example, as described above, the UE may be scheduled to transmit a PUCCH or a PUSCH to a base station, to transmit a PSCCH or a PSSCH to another UE, to receive a PDCCH or a PDSCH from a base station, and/or to receive a PSCCH or a PSSCH from another UE. In some aspects, as described herein, the UE may be configured to transmit and/or receive the one or more scheduled communications using RE segments that are based on energy levels associated with the RE segments. For example, as shown, the transmitter may segment a source bit sequence into multiple sub-sequences that are each associated with a respective RE segment, and each RE segment may include one or more REs within one or more scheduled PRBs associated with a scheduled communication. In some aspects, the RE(s) within an RE segment can be contiguous or non-contiguous in a time domain and/or a frequency domain, where contiguous REs may provide reduced encoding and decoding complexity and non-contiguous REs may increase diversity (e.g., using interleaved control channel elements (CCEs) and/or RE group (REG) bundles to improve PDCCH reliability). In some aspects, each sub-sequence and corresponding RE segment may be associated with a neural network that modulates the associated sub-sequence to the REs within the corresponding RE segment. In particular, outputs from each neural network may be energies on a corresponding set of physical layer resources (e.g., the REs within an RE segment), with the energies normalized over the set of physical layer resources (e.g., over the RE segment) based on a transmit power configuration associated with the transmitter.

For example, as shown, a source bit sequence '0110 . . . 1101 . . . 0010 . . . 0101 . . . " may be segmented into four sub-sequences, which include sub-sequences '0110 . . . ," "1101 . . . ," "0010 . . . ," and "0101." At the transmitter, each sub-sequence is provided to a neural network that modulates the associated sub-sequence to a set of contiguous or non-contiguous REs within an RE segment. In general, the source bit sequence may be associated with a scheduled communication (e.g., a PUCCH, PUSCH, PDCCH, PDSCH, PSSCH, or PSSCH), and the RE segments that are associated with the various sub-sequences (and the REs included within each RE segment) may be included within one or more scheduled PRBs associated with the scheduled communication. For example, FIG. 6 illustrates an example where the source bit sequence is modulated to the REs in four RE segments (shown by different shadings) that are within one or more scheduled PRBs associated with a scheduled communication. Accordingly, the four sub-sequences associated with the source bit sequence may each be associated with a respective neural network (e.g., NN #0 trough NN #4), with outputs from the neural networks being energies on the corresponding REs normalized over the RE segment. In this way, the receiver may detect energies on the REs within each RE segment (e.g., using a receiver neural network, as shown, or another suitable technique such as maximum likelihood detection) to demodulate the transmitted sub-sequences and thereby decode a detected bit sequence that approximates the source bit sequence.

Accordingly, as shown by reference number 620, the UE may determine one or more segmentation methods and/or associated neural networks to be used to transmit and/or receive a scheduled communication. For example, the one or more segmentation methods may indicate a technique used to segment one or more scheduled PRBs into the multiple RE segments that correspond to the multiple sub-sequences associated with the source bit sequence. Additionally, or alternatively, the one or more segmentation methods may indicate a technique used to segment one or more RE segments into REs that may be contiguous or non-contiguous in a time domain and/or a frequency domain (e.g., to define how many REs are within an RE segment). Additionally, or alternatively, the one or more segmentation methods may indicate a number of bits to be included in each sub-sequence and/or a technique used to segment the source bit sequence into the multiple sub-sequences.

In some aspects, a base station may signal the segmentation method(s) associated with segmenting the scheduled PRBs into the RE segments, and/or the segmentation method(s) associated with segmenting the source bit sequence into the multiple sub-sequences, to the UE. For example, the base station may be the device that communicates control channels and/or data channels with the UE using noncoherent wireless communication, or may be a device that schedules noncoherent sidelink communication between the UE and the other device. In either case, the base station may transmit, and the UE may receive, signaling that indicates the segmentation method(s) associated with the RE segments and/or the bit sequences, where the signaling may include one or more radio resource control (RRC) and/or downlink control information (DCI) messages. For example, in some aspects, the signaling may include one or more RRC messages that preconfigure a set of N segmentation method options and one or more DCI messages that select one of the N segmentation method options (e.g., when scheduling a PDSCH, PUSCH, and/or PSSCH). Additionally, or alternatively, one or more RRC messages may preconfigure a segmentation method for a particular PUCCH resource, PUCCH resource set, PDCCH search space, and/or PDCCH control resource set (CORESET), among other examples.

In some aspects, as described above, each RE segment may be associated with a neural network that modulates a sub-sequence associated with a source bit sequence to the REs in the corresponding RE segment. For example, as shown in FIG. 6, a first sub-sequence (e.g., "0100 . . .") is associated with a first neural network (e.g., NN #0) that modulates the first sub-sequence to a first RE segment, a second sub-sequence (e.g., "1101 . . .") is associated with a second neural network (e.g., NN #2) that modulates the second sub-sequence to a second RE segment, and so on. Accordingly, in some aspects, a configuration of the neural networks that modulate the various sub-sequences to the different RE segments may depend on the segmentation method(s) that are configured across the one or more scheduled PRBs.

For example, in some aspects, a common segmentation method may be configured across the scheduled PRB(s), in which case each RE segment may have the same number of REs and/or the same number of OFDM symbols. Furthermore, in cases where a common segmentation method is configured across the scheduled PRB(s), each RE segment may be associated with the same number of bits (e.g., the source bit sequence is segmented into multiple sub-sequences that each have the same number of bits). In such cases, where a common segmentation method is indicated or otherwise configured across the scheduled PRB(s), each RE segment may be associated with an identical transmission neural network, which may be signaled to the UE in one or more RRC and/or DCI messages together with the common segmentation method. In some aspects, the transmission neural network used to modulate the sub-sequences onto the RE segments may generally include one or more parameters (e.g., for input neurons, hidden layers, output neurons, and/or weightings, among other examples) that are preconfigured and/or network-configured (or indicated), and neural networks for downlink reception (e.g., PDCCH and/or PDSCH reception) may be configured and/or indicated via one or more RRC messages, a medium access control (MAC) control element (MAC-CE), and/or one or more DCI messages.

Alternatively, in some aspects, a non-common segmentation method may be configured across the scheduled PRB(s). In such cases, the RE segments that are associated with the different sub-sequences may include at least a first RE segment and a second RE segment that have a different number of REs and/or a different number of OFDM symbols. Additionally, or alternatively, in cases where a non-common segmentation method is configured across the scheduled PRB(s), any two RE segments may be associated with a different number of bits (e.g., the source bit sequence may be segmented into multiple sub-sequences that have a non-uniform number of bits). In such cases, where a non-common segmentation method is indicated or otherwise configured across the scheduled PRB(s), different RE segments may be associated with different transmission neural networks, which may be signaled to the UE in one or more RRC and/or DCI messages together with the non-common segmentation method. For example, in some aspects, the different neural networks may include convolutional neural networks with different numbers of kernels and/or different kernel coefficients. In some aspects, the transmission neural networks used to modulate the sub-sequences onto the RE segments may include one or more parameters that are preconfigured and/or network-configured (or indicated), and neural networks for downlink reception may be configured and/or indicated via one or more RRC messages, a MAC-CE, and/or one or more DCI messages, among other examples.

Accordingly, as further shown by reference number 630, the UE and the other device may perform noncoherent wireless communication for a scheduled PxxCH communication using an energy-based autoencoder that is configured in the manner described in further detail above. For example, in some aspects, a transmitter (e.g., the UE or the other device) may use one or more neural networks to modulate the source bit sequence onto corresponding RE segments within one or more scheduled PRBs associated with the scheduled PxxCH communication, with outputs from the neural network(s) being energies on the corresponding physical layer resources (e.g., the RE segments). In some aspects, at the receiver, one or more reception neural networks can be used to demodulate the transmitted bit sequences based at least in part on the energies on the corresponding physical layer resources.

Furthermore, in cases where the scheduled PxxCH is a PUCCH that the UE transmits to a base station using an energy autoencoder, a PUCCH format may be defined based at least in part on the segmentation method(s) associated with segmenting the scheduled PRB(s) into the RE segments, the segmentation method(s) associated with segmenting the source bit sequence into the multiple sub-sequences, and/or the associated neural networks that are used to modulate the sub-sequences onto the RE segments. Additionally, or alternatively, different PUCCH resources within a PUCCH resource set may be associated with the same segmentation method, with different segmentation methods, with the same neural network, and/or with different neural networks. Furthermore, in cases where the PUCCH carries hybrid automatic repeat request acknowledgement (HARQ-ACK) feedback for a PDSCH, one or more DCI messages that schedule the PDSCH may indicate a PUCCH resource for the HARQ-ACK feedback associated with the PDSCH. In such cases, the DCI message(s) scheduling the PDSCH may indicate the segmentation method(s) and/or the associated transmission neural network(s) for the noncoherent transmission of the PUCCH.

Alternatively, in cases where the scheduled PxxCH is a PDCCH that a base station transmits to the UE using an energy autoencoder, the segmentation method(s) associated with segmenting the scheduled PRB(s) into the RE segments and/or segmenting the source bit sequence into the multiple sub-sequences may be based on one or more REG bundles and/or one or more CCEs. Furthermore, the PDCCH may be associated with an aggregation level, a search space, and/or a CORESET based at least in part on the configured segmentation method(s) and/or the associated neural network(s) used to modulate the sub-sequences onto the RE segments associated with the PDCCH (e.g., different aggregation levels, search spaces, and/or CORESETS can be configured or defined for different segmentation methods and/or neural networks). In addition, in cases where the PDCCH is overbooked (e.g., where a blind detection or channel estimation limit is lower than a determined number of PDCCH decodings) and/or the UE is configured to operate in a power saving mode (e.g., a discontinuous reception (DRX) mode and/or a sleep mode, among other examples), the UE may determine a priority associated with a particular PDCCH search space and/or CORESET based at least in part on the segmentation method(s) and/or associated neural network (s). For example, search spaces and/or CORESETs associated with different segmentation methods and/or neural networks may have different priorities, whereby the UE may determine whether to monitor or refrain from monitoring a search space and/or a CORESET associated with a PDCCH based on the priority associated with the segmentation method and/or the associated neural network corresponding to the search space and/or CORESET. For example, a search space or a CORESET that is associated with a neural network having a large number neurons may have a relatively low priority when the UE is operating in a DRX mode in cases where blind detection or channel estimation limits are lower than the determined number of PDCCH decodings.

As indicated above, FIG. 6 is provided as an example. Other examples may differ from what is described with regard to FIG. 6.

Figure 7:
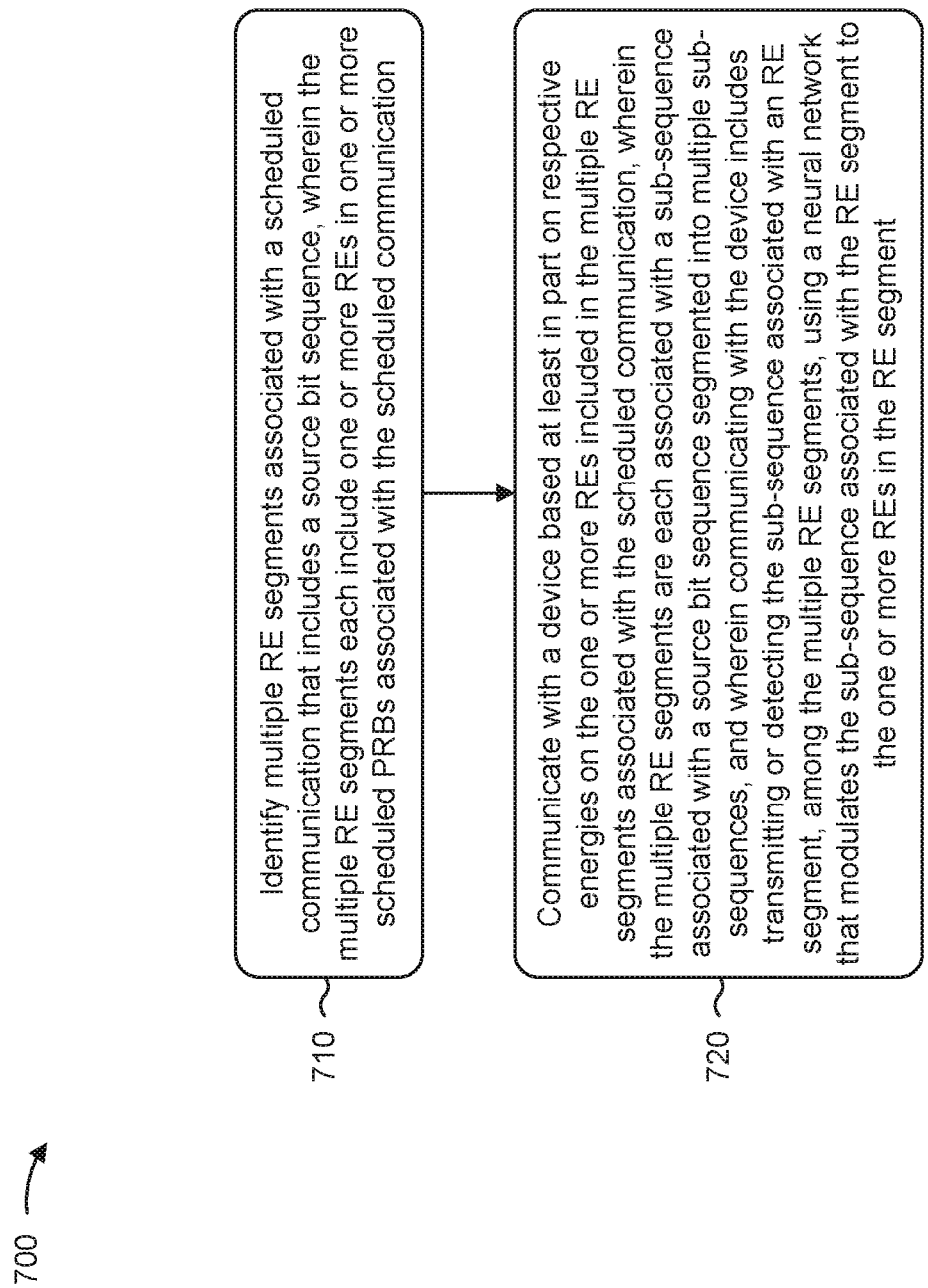
FIG. 7 is a diagram illustrating an example process associated with scheduling energy autoencoder based noncoherent transmission, in accordance with various aspects of the present disclosure.

FIG. 7 is a diagram illustrating an example process 700 performed, for example, by a UE, in accordance with various aspects of the present disclosure. Example process 700 is an example where the UE (e.g., UE 120) performs operations associated with scheduling energy autoencoder based noncoherent transmission.

As shown in FIG. 7, in some aspects, process 700 may include identifying multiple RE segments associated with a scheduled communication that includes a source bit sequence, wherein the multiple RE segments each include one or more REs in one or more scheduled PRBs associated with the scheduled communication (block 710). For example, the UE (e.g., using identification component 808, depicted in FIG. 8) may identify multiple RE segments associated with a scheduled communication that includes a source bit sequence, wherein the multiple RE segments each include one or more REs in one or more scheduled PRBs associated with the scheduled communication, as described above.

As further shown in FIG. 7, in some aspects, process 700 may include communicating with a device based at least in part on respective energies on the one or more REs included in the multiple RE segments associated with the scheduled communication, wherein the multiple RE segments are each associated with a sub-sequence associated with a source bit sequence segmented into multiple sub-sequences, and wherein communicating with the device includes transmitting or detecting the sub-sequence associated with an RE segment, among the multiple RE segments, using a neural network that modulates the sub-sequence associated with the RE segment to the one or more REs in the RE segment (block 720). For example, the UE (e.g., using communication component 810, depicted in FIG. 8) may communicate with a device based at least in part on respective energies on the one or more REs included in the multiple RE segments associated with the scheduled communication, wherein the multiple RE segments are each associated with a sub-sequence associated with a source bit sequence segmented into multiple sub-sequences, and wherein communicating with the device includes transmitting or detecting the sub-sequence associated with an RE segment, among the multiple RE segments, using a neural network that modulates the sub-sequence associated with the RE segment to the one or more REs in the RE segment, as described above.

Process 700 may include additional aspects, such as any single aspect or any combination of aspects described below and/or in connection with one or more other processes described elsewhere herein.

In a first aspect, the multiple RE segments include at least one RE segment in which the one or more REs are contiguous.

In a second aspect, alone or in combination with the first aspect, the multiple RE segments include at least one RE segment in which the one or more REs are non-contiguous.

In a third aspect, alone or in combination with one or more of the first and second aspects, an output from the neural network includes the respective energies on the one or more REs normalized over the RE segment.

In a fourth aspect, alone or in combination with one or more of the first through third aspects, process 700 includes receiving signaling that indicates one or more of a segmentation method associated with the one or more REs in the RE segment, a segmentation method associated with one or more bits in the sub-sequence associated with the RE segment, or the neural network that modulates the sub-sequence associated with the RE segment to the one or more REs in the RE segment.

In a fifth aspect, alone or in combination with one or more of the first through fourth aspects, the signaling includes one or more RRC or DCI messages.

In a sixth aspect, alone or in combination with one or more of the first through fifth aspects, each RE segment has the same number of REs, symbols, and bits as each other RE segment.

In a seventh aspect, alone or in combination with one or more of the first through sixth aspects, the multiple RE segments are each associated with an identical neural network that modulates the sub-sequence associated with a respective RE segment to the one or more REs in the respective RE segment.

In an eighth aspect, alone or in combination with one or more of the first through seventh aspects, the multiple RE segments include a first RE segment and a second RE segment that include one or more of a different number of REs, a different number of symbols, or a different number of bits.

In a ninth aspect, alone or in combination with one or more of the first through eighth aspects, different RE segments are associated with different neural networks that are used to modulate the sub-sequence associated with a respective RE segment to the one or more REs in the respective RE segment.

In a tenth aspect, alone or in combination with one or more of the first through ninth aspects, the different neural networks include different convolutional neural networks with different numbers or different coefficients of kernels.

In an eleventh aspect, alone or in combination with one or more of the first through tenth aspects, the scheduled communication includes a non-coherent control channel transmission or a non-coherent data channel transmission.

In a twelfth aspect, alone or in combination with one or more of the first through eleventh aspects, communicating with the device includes determining that the scheduled communication includes a PUCCH, determining a PUCCH format based at least in part on one or more segmentation methods or transmission neural networks associated with modulating the multiple sub-sequences to the one or more REs in the multiple RE segments, and transmitting the PUCCH based at least in part on the PUCCH format.

In a thirteenth aspect, alone or in combination with one or more of the first through twelfth aspects, transmitting the PUCCH includes determining a PUCCH resource set associated with the PUCCH, and modulating, for different PUCCH resources within the PUCCH resource set, the multiple sub-sequences to the one or more REs in the multiple RE segments using the one or more segmentation methods or transmission neural networks, wherein the one or more segmentation methods or transmission neural networks are configured by configurations associated with the PUCCH resources.

In a fourteenth aspect, alone or in combination with one or more of the first through thirteenth aspects, transmitting the PUCCH includes determining, based at least in part on DCI that indicates a PUCCH resource for HARQ-ACK feedback associated with a PDSCH scheduled by the DCI, the one or more segmentation methods or transmission neural networks associated with modulating the multiple sub-sequences, and modulating the multiple sub-sequences to the one or more REs in the multiple RE segments using the one or more segmentation methods or transmission neural networks for the PUCCH resource indicated in the DCI.

In a fifteenth aspect, alone or in combination with one or more of the first through fourteenth aspects, communicating with the device includes determining that the scheduled communication includes a PDCCH, determining one or more segmentation methods or transmission neural networks associated with modulating the multiple sub-sequences to the one or more REs in the multiple RE segments based at least in part on one or more REG bundles or CCEs associated with the PDCCH, and detecting the source bit sequence in the PDCCH based at least in part on the one or more segmentation methods or transmission neural networks.

In a sixteenth aspect, alone or in combination with one or more of the first through fifteenth aspects, the source bit sequence is detected based at least in part on one or more aggregation levels associated with the one or more segmentation methods or transmission neural networks.

In a seventeenth aspect, alone or in combination with one or more of the first through sixteenth aspects, the source bit sequence is detected based at least in part on one or more search spaces or CORESETs associated with the one or more segmentation methods or transmission neural networks.

In an eighteenth aspect, alone or in combination with one or more of the first through seventeenth aspects, process 700 includes determining a priority associated with the one or more search spaces or CORESETs based at least in part on the one or more segmentation methods or transmission neural networks, and monitoring the PDCCH based at least in part on the priority associated with the one or more search spaces or CORESETs.

In a nineteenth aspect, alone or in combination with one or more of the first through eighteenth aspects, process 700 includes determining a priority associated with the one or more search spaces or CORESETs based at least in part on the one or more segmentation methods or transmission neural networks, and refraining from monitoring the PDCCH based at least in part on the priority associated with the one or more search spaces or CORESETs.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
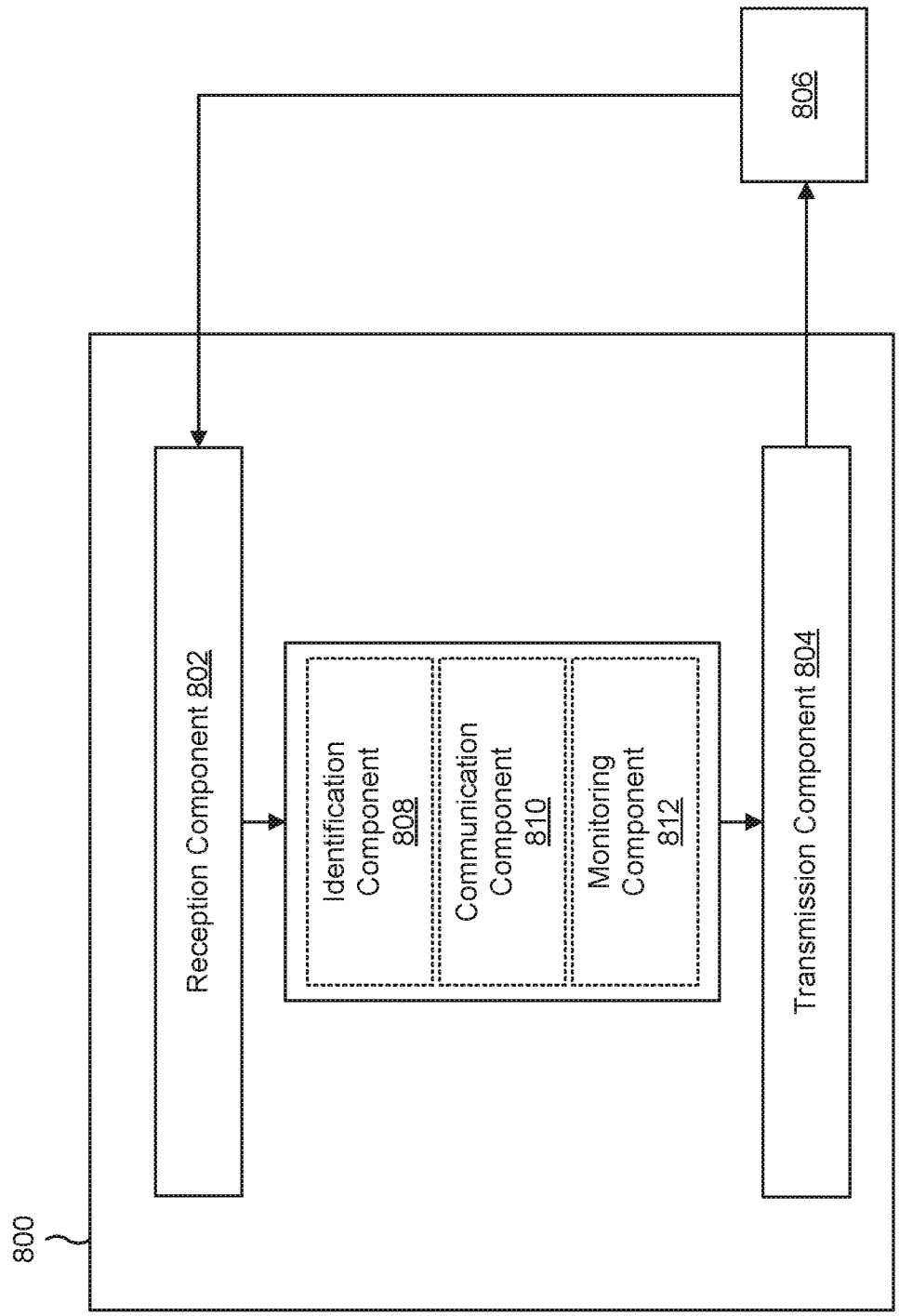
FIG. 8 is a block diagram of an example apparatus for wireless communication, in accordance with various aspects of the present disclosure.

FIG. 8 is a block diagram of an example apparatus 800 for wireless communication. The apparatus 800 may be a UE, or a UE may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include one or more of an identification component 808, a communication component 810, or a monitoring component 812, among other examples.

In some aspects, the apparatus 800 may be configured to perform one or more operations described herein in connection with FIG. 6. Additionally, or alternatively, the apparatus 800 may be configured to perform one or more processes described herein, such as process 700 of FIG. 7. In some aspects, the apparatus 800 and/or one or more components shown in FIG. 8 may include one or more components of the UE described above in connection with FIG. 2. Additionally, or alternatively, one or more components shown in FIG. 8 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 806. In some aspects, the reception component 802 may include one or more antennas, a demodulator, a MIMO detector, a receive processor, a controller/processor, a memory, or a combination thereof, of the UE described above in connection with FIG. 2.

The transmission component 804 may transmit communications, such as reference signals, control information, data communications, or a combination thereof, to the apparatus 806. In some aspects, one or more other components of the apparatus 806 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modulator, a transmit MIMO processor, a transmit processor, a controller/processor, a memory, or a combination thereof, of the UE described above in connection with FIG. 2. In some aspects, the transmission component 804 may be co-located with the reception component 802 in a transceiver.

The identification component 808 may identify multiple RE segments associated with a scheduled communication that includes a source bit sequence, wherein the multiple RE segments each include one or more REs in one or more scheduled PRBs associated with the scheduled communication. The communication component 810 may communicate, or may cause reception component 802 and/or transmission component 804 to communicate, with a device based at least in part on respective energies on the one or more REs included in the multiple RE segments associated with the scheduled communication, wherein the multiple RE segments are each associated with a sub-sequence associated with a source bit sequence segmented into multiple sub-sequences, and wherein communicating with the device includes transmitting or detecting the sub-sequence associated with an RE segment, among the multiple RE segments, using a neural network that modulates the sub-sequence associated with the RE segment to the one or more REs in the RE segment.

The reception component 802 may receive signaling that indicates one or more of a segmentation method associated with the one or more REs in the RE segment, a segmentation method associated with one or more bits in the sub-sequence associated with the RE segment, or the neural network that modulates the sub-sequence associated with the RE segment to the one or more REs in the RE segment.

The monitoring component 812 may determine a priority associated with the one or more search spaces or CORESETs based at least in part on the one or more segmentation methods or transmission neural networks, and the monitoring component 812 may monitor the PDCCH based at least in part on the priority associated with the one or more search spaces or CORESETs.

The monitoring component 812 may determine a priority associated with the one or more search spaces or CORESETs based at least in part on the one or more segmentation methods or transmission neural networks, and the monitoring component 812 may refrain from monitoring the PDCCH based at least in part on the priority associated with the one or more search spaces or CORESETs.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

The following provides an overview of aspects of the present disclosure:

Aspect 1: A method of wireless communication performed by a UE, comprising: identifying multiple RE segments associated with a scheduled communication that includes a source bit sequence, wherein the multiple RE segments each include one or more REs in one or more scheduled PRBs associated with the scheduled communication; and communicating with a device based at least in part on respective energies on the one or more REs included in the multiple RE segments associated with the scheduled communication, wherein the multiple RE segments are each associated with a sub-sequence associated with a source bit sequence segmented into multiple sub-sequences, and wherein communicating with the device includes transmitting or detecting the sub-sequence associated with an RE segment, among the multiple RE segments, using a neural network that modulates the sub-sequence associated with the RE segment to the one or more REs in the RE segment.

Aspect 2: The method of aspect 1, wherein the multiple RE segments include at least one RE segment in which the one or more REs are contiguous.

Aspect 3: The method of aspect 1, wherein the multiple RE segments include at least one RE segment in which the one or more REs are non-contiguous.

Aspect 4: The method of any of aspects 1-3, wherein an output from the neural network includes the respective energies on the one or more REs normalized over the RE segment.

Aspect 5: The method of any of aspects 1-4, further comprising: receiving signaling that indicates one or more of a segmentation method associated with the one or more REs in the RE segment, a segmentation method associated with one or more bits in the sub-sequence associated with the RE segment, or the neural network that modulates the sub-sequence associated with the RE segment to the one or more REs in the RE segment.

Aspect 6: The method of aspect 5, wherein the signaling includes one or more RRC or DCI messages.

Aspect 7: The method of any of aspects 1-6, wherein each RE segment has the same number of REs, symbols, and bits as each other RE segment.

Aspect 8: The method of any of aspects 1-7, wherein the multiple RE segments are each associated with an identical neural network that modulates the sub-sequence associated with a respective RE segment to the one or more REs in the respective RE segment.

Aspect 9: The method of any of aspects 1-6, wherein the multiple RE segments include a first RE segment and a second RE segment that include one or more of a different number of REs, a different number of symbols, or a different number of bits.

Aspect 10: The method of any of aspects 1-9, wherein different RE segments are associated with different neural networks that are used to modulate the sub-sequence associated with a respective RE segment to the one or more REs in the respective RE segment.

Aspect 11: The method of aspect 10, wherein the different neural networks include different convolutional neural networks with different numbers or different coefficients of kernels.

Aspect 12: The method of any of aspects 1-11, wherein the scheduled communication includes a non-coherent control channel transmission or a non-coherent data channel transmission.

Aspect 13: The method of any of aspects 1-12, wherein communicating with the device includes: determining that the scheduled communication includes a PUCCH; determining a PUCCH format based at least in part on one or more segmentation methods or transmission neural networks associated with modulating the multiple sub-sequences to the one or more REs in the multiple RE segments; and transmitting the PUCCH based at least in part on the PUCCH format.

Aspect 14: The method of aspect 13, wherein transmitting the PUCCH includes: determining a PUCCH resource set associated with the PUCCH; and modulating, for different PUCCH resources within the PUCCH resource set, the multiple sub-sequences to the one or more REs in the multiple RE segments using the one or more segmentation methods or transmission neural networks, wherein the one or more segmentation methods or transmission neural networks are configured by configurations associated with the PUCCH resources.

Aspect 15: The method of any of aspects 13-14, wherein transmitting the PUCCH includes: determining, based at least in part on DCI that indicates a PUCCH resource for HARQ-ACK feedback associated with a PDSCH scheduled by the DCI, the one or more segmentation methods or transmission neural networks associated with modulating the multiple sub-sequences; and modulating the multiple sub-sequences to the one or more REs in the multiple RE segments using the one or more segmentation methods or transmission neural networks for the PUCCH resource indicated in the DCI.

Aspect 16: The method of any of aspects 1-15, wherein communicating with the device includes: determining that the scheduled communication includes a PDCCH;

determining one or more segmentation methods or transmission neural networks associated with modulating the multiple sub-sequences to the one or more REs in the multiple RE segments based at least in part on one or more REG bundles or CCEs associated with the PDCCH; and detecting the source bit sequence in the PDCCH based at least in part on the one or more segmentation methods or transmission neural networks.

Aspect 17: The method of aspect 16, wherein the source bit sequence is detected based at least in part on one or more aggregation levels associated with the one or more segmentation methods or transmission neural networks.

Aspect 18: The method of any of aspects 16-17, wherein the source bit sequence is detected based at least in part on one or more search spaces or CORESETs associated with the one or more segmentation methods or transmission neural networks.

Aspect 19: The method of any of aspects 1-18, further comprising: determining a priority associated with the one or more search spaces or CORESETs based at least in part on the one or more segmentation methods or transmission neural networks; and monitoring the PDCCH based at least in part on the priority associated with the one or more search spaces or CORESETs.

Aspect 20: The method of any of aspects 1-18, further comprising: determining a priority associated with the one or more search spaces or CORESETs based at least in part on the one or more segmentation methods or transmission neural networks; and refraining from monitoring the PDCCH based at least in part on the priority associated with the one or more search spaces or CORESETs.

Aspect 21: An apparatus for wireless communication at a device, comprising a processor; memory coupled with the processor; and instructions stored in the memory and executable by the processor to cause the apparatus to perform the method of any of aspects 1-20.

Aspect 22: A device for wireless communication, comprising a memory and one or more processors coupled to the memory, the memory and the one or more processors configured to perform the method of any of aspects 1-20.

Aspect 23: An apparatus for wireless communication, comprising at least one means for performing the method of any of aspects 1-20.

Aspect 24: A non-transitory computer-readable medium storing code for wireless communication, the code comprising instructions executable by a processor to perform the method of any of aspects 1-20.

Aspect 25: A non-transitory computer-readable medium storing a set of instructions for wireless communication, the set of instructions comprising one or more instructions that, when executed by one or more processors of a device, cause the device to perform the method of any of aspects 1-20.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
   identifying multiple resource element (RE) segments associated with a scheduled communication that includes a source bit sequence, wherein the multiple RE segments each include one or more REs in one or more scheduled physical resource blocks (PRBs) associated with the scheduled communication; and
   communicating with a device based at least in part on respective energies on the one or more REs included in the multiple RE segments associated with the scheduled communication, wherein the multiple RE segments are each associated with a sub-sequence associated with a source bit sequence segmented into multiple sub-sequences, and wherein communicating with the device includes transmitting or detecting the sub-sequence associated with an RE segment, among the multiple RE segments, using a neural network that modulates the sub-sequence associated with the RE segment to the one or more REs in the RE segment.

2. The method of claim 1, wherein the multiple RE segments include at least one RE segment in which the one or more REs are contiguous.

3. The method of claim 1, wherein the multiple RE segments include at least one RE segment in which the one or more REs are non-contiguous.

4. The method of claim 3, wherein an output from the neural network includes the respective energies on the one or more REs normalized over the RE segment.

5. The method of claim 1, further comprising:
   receiving signaling that indicates one or more of a segmentation method associated with the one or more REs in the RE segment, a segmentation method associated with one or more bits in the sub-sequence associated with the RE segment, or the neural network that modulates the sub-sequence associated with the RE segment to the one or more REs in the RE segment.

6. The method of claim 5, wherein the signaling includes one or more radio resource control or downlink control information messages.

7. The method of claim 1, wherein each RE segment has the same number of REs, symbols, and bits as each other RE segment.

8. The method of claim 7, wherein the multiple RE segments are each associated with an identical neural network that modulates the sub-sequence associated with a respective RE segment to the one or more REs in the respective RE segment.

9. The method of claim 1, wherein the multiple RE segments include a first RE segment and a second RE segment that include one or more of a different number of REs, a different number of symbols, or a different number of bits.

10. The method of claim 9, wherein different RE segments are associated with different neural networks that are used to modulate the sub-sequence associated with a respective RE segment to the one or more REs in the respective RE segment.

11. The method of claim 10, wherein the different neural networks include different convolutional neural networks with different numbers or different coefficients of kernels.

12. The method of claim 1, wherein the scheduled communication includes a non-coherent control channel transmission or a non-coherent data channel transmission.

13. A user equipment (UE) for wireless communication, comprising:
   a memory; and
   one or more processors operatively coupled to the memory, the memory and the one or more processors configured to:
   identify multiple resource element (RE) segments associated with a scheduled communication that includes a source bit sequence, wherein the multiple RE segments each include one or more REs in one or more scheduled physical resource blocks (PRBs) associated with the scheduled communication; and
   communicate with a device based at least in part on respective energies on the one or more REs included in the multiple RE segments associated with the scheduled communication, wherein the multiple RE segments are each associated with a sub-sequence associated with a source bit sequence segmented into multiple sub-sequences, and wherein communicating with the device includes transmitting or detecting the sub-sequence associated with an RE segment, among the multiple RE segments, using a neural network that modulates the sub-sequence associated with the RE segment to the one or more REs in the RE segment.

14. The UE of claim 13, wherein the multiple RE segments include at least one RE segment in which the one or more REs are contiguous.

15. The UE of claim 13, wherein the multiple RE segments include at least one RE segment in which the one or more REs are non-contiguous.

16. The UE of claim 15, wherein an output from the neural network includes the respective energies on the one or more REs normalized over the RE segment.

17. The UE of claim 13, wherein the one or more processors are further configured to:
   receive signaling that indicates one or more of a segmentation method associated with the one or more REs in the RE segment, a segmentation method associated with one or more bits in the sub-sequence associated with the RE segment, or the neural network that modulates the sub-sequence associated with the RE segment to the one or more REs in the RE segment.

18. The UE of claim 17, wherein the signaling includes one or more radio resource control or downlink control information messages.

19. The UE of claim 13, wherein each RE segment has the same number of REs, symbols, and bits as each other RE segment.

20. The UE of claim 19, wherein the multiple RE segments are each associated with an identical neural network that modulates the sub-sequence associated with a respective RE segment to the one or more REs in the respective RE segment.

21. The UE of claim 13, wherein the multiple RE segments include a first RE segment and a second RE segment that include one or more of a different number of REs, a different number of symbols, or a different number of bits.

22. The UE of claim 21, wherein different RE segments are associated with different neural networks that are used to modulate the sub-sequence associated with a respective RE segment to the one or more REs in the respective RE segment.

23. The UE of claim 22, wherein the different neural networks include different convolutional neural networks with different numbers or different coefficients of kernels.

24. The UE of claim 13, wherein the scheduled communication includes a non-coherent control channel transmission or a non-coherent data channel transmission.

25. The UE of claim 13, wherein the one or more processors, when communicating with the device, are configured to:
  determine that the scheduled communication includes a physical uplink control channel (PUCCH);
  determine a PUCCH format based at least in part on one or more segmentation methods or transmission neural networks associated with modulating the multiple sub-sequences to the one or more REs in the multiple RE segments; and
  transmit the PUCCH based at least in part on the PUCCH format.

26. The UE of claim 25, wherein the one or more processors, when transmitting the PUCCH, are configured to:
  determine a PUCCH resource set associated with the PUCCH; and
  modulate, for different PUCCH resources within the PUCCH resource set, the multiple sub-sequences to the one or more REs in the multiple RE segments using the one or more segmentation methods or transmission neural networks, wherein the one or more segmentation methods or transmission neural networks are configured by configurations associated with the PUCCH resources.

27. The UE of claim 25, wherein the one or more processors, when transmitting the PUCCH, are configured to:
  determine, based at least in part on downlink control information (DCI) that indicates a PUCCH resource for hybrid automatic repeat request acknowledgement (HARQ-ACK) feedback associated with a physical downlink shared channel (PDSCH) scheduled by the DCI, the one or more segmentation methods or transmission neural networks associated with modulating the multiple sub-sequences; and
  modulate the multiple sub-sequences to the one or more REs in the multiple RE segments using the one or more segmentation methods or transmission neural networks for the PUCCH resource indicated in the DCI.

28. The UE of claim 13, wherein the one or more processors, when communicating with the device, are configured to:
  determine that the scheduled communication includes a physical downlink control channel (PDCCH);
  determine one or more segmentation methods or transmission neural networks associated with modulating the multiple sub-sequences to the one or more REs in the multiple RE segments based at least in part on one or more resource element group (REG) bundles or control channel elements (CCEs) associated with the PDCCH; and
  detect the source bit sequence in the PDCCH based at least in part on the one or more segmentation methods or transmission neural networks.

29. The UE of claim 28, wherein the source bit sequence is detected based at least in part on one or more aggregation levels associated with the one or more segmentation methods or transmission neural networks.

30. The UE of claim 28, wherein the source bit sequence is detected based at least in part on one or more search spaces or control resource sets (CORESETs) associated with the one or more segmentation methods or transmission neural networks.

31. The UE of claim 30, wherein the one or more processors are further configured to:
  determine a priority associated with the one or more search spaces or CORESETs based at least in part on the one or more segmentation methods or transmission neural networks; and
  monitor the PDCCH based at least in part on the priority associated with the one or more search spaces or CORESETs.

32. The UE of claim 30, wherein the one or more processors are further configured to:
  determine a priority associated with the one or more search spaces or CORESETs based at least in part on the one or more segmentation methods or transmission neural networks; and
  refrain from monitoring the PDCCH based at least in part on the priority associated with the one or more search spaces or CORESETs.

33. A non-transitory computer-readable medium storing a set of instructions for wireless communication, the set of instructions comprising:
  one or more instructions that, when executed by one or more processors of a user equipment (UE), cause the UE to:
  identify multiple resource element (RE) segments associated with a scheduled communication that includes a source bit sequence, wherein the multiple RE segments each include one or more REs in one or more scheduled physical resource blocks (PRBs) associated with the scheduled communication; and
  communicate with a device based at least in part on respective energies on the one or more REs included in the multiple RE segments associated with the scheduled communication, wherein the multiple RE segments are each associated with a sub-sequence associated with a source bit sequence segmented into multiple sub-sequences, and wherein communicating with the device includes transmitting or detecting the sub-sequence associated with an RE segment, among the multiple RE segments, using a neural network that modulates the sub-sequence associated with the RE segment to the one or more REs in the RE segment.

34. An apparatus for wireless communication, comprising:
  means for identifying multiple resource element (RE) segments associated with a scheduled communication that includes a source bit sequence, wherein the multiple RE segments each include one or more REs in one or more scheduled physical resource blocks (PRBs) associated with the scheduled communication; and
  means for communicating with a device based at least in part on respective energies on the one or more REs included in the multiple RE segments associated with the scheduled communication, wherein the multiple RE segments are each associated with a sub-sequence associated with a source bit sequence segmented into multiple sub-sequences, and wherein the means for communicating with the device includes means for transmitting or detecting the sub-sequence associated with an RE segment, among the multiple RE segments, using a neural network that modulates the sub-sequence associated with the RE segment to the one or more REs in the RE segment.

* * * * *